United States Patent
Searle et al.

[15] 3,679,297
[45] July 25, 1972

[54] DISPLAY SYSTEMS

[72] Inventors: Simon M. St. L. Searle, Cranham; Christopher H. C. Walker, Isle of Wight, both of England

[73] Assignee: Smiths Industries Limited, London, England

[22] Filed: Feb. 26, 1970

[21] Appl. No.: 14,439

[30] Foreign Application Priority Data

Feb. 28, 1969 Great Britain......................10,815/69

[52] U.S. Cl..............................353/14, 35/12 N, 73/178 R, 116/129 R, 350/174, 350/316, 353/31, 353/35, 353/84, 356/251
[51] Int. Cl....................G03b 21/00, G09f 9/00, G02b 5/22
[58] Field of Search................353/14, 84, 11, 12, 13, 31, 353/35; 116/129 R; 35/12 N; 356/251 CL; 350/174, 316; 73/178 R

[56] References Cited

UNITED STATES PATENTS

| | | |
|---|---|---|
| 2,738,490 | 3/1956 | Mihalakis.................................353/14 |
| 2,693,131 | 11/1954 | Mihalakis.................................353/14 |
| 2,579,806 | 12/1951 | Dvorkin...................................353/14 |
| 2,685,226 | 8/1954 | Crane......................................353/14 |
| 2,504,114 | 4/1950 | De Martino.............................350/316 |

FOREIGN PATENTS OR APPLICATIONS 990,740 4/1965 Great Britain.....................116/129 R

*Primary Examiner*—Leonard Forman
*Assistant Examiner*—Steven L. Stephan
*Attorney*—William D. Hall, Elliott I. Pollock, Fred C. Philpitt, George Vande Sande, Charles F. Steininger and Robert R. Priddy

[57] ABSTRACT

An aircraft head-up display is projected from symbol-markings borne by two complementary color filters superimposed in the light-path from an electric lamp. An horizon-line marking of the first filter has the color of the second filter bearing a flight-vector marking, and vice versa, but either marking may be transparent. The filters are separately driven to follow aircraft movements with the symbol-images simulating the true horizon and flight-vector. A third filter with glide-slope marking may be carried adjustably with the first filter to allow modification of indicated glide-slope below the horizon.

10 Claims, 5 Drawing Figures

PATENTED JUL 25 1972 3,679,297

Simon M. St.L. Searle
Christopher H.C. Walker
Inventors

Hall, Pollock & Vande Sande
Attorneys

DISPLAY SYSTEMS

BACKGROUND OF THE INVENTION

This invention relates to display systems.

The invention is particularly, though not exclusively, concerned with head-up display systems for use in aircraft, that is to say, with systems of the kind in which a display is projected onto a partially-transparent reflector in the line-of-sight of a pilot of an aircraft so as to provide a virtual image that is viewed by the pilot against the background of the external scene through the aircraft-windscreen. The display is normally provided by a cathode-ray tube and involves symbols that in the image appearing in the display area provided by the partially-transparent reflector, are positioned against the background of the external scene to give indication of such factors as aircraft attitude and flight-path. The use of a cathode-ray tube, however, necessarily involves the provision of somewhat complex electrical circuits for the generation and position-control of the symbols in the display, and these have the disadvantage of contributing substantially to the complication, and accordingly cost, of the display system. It is an object of the present invention to provide a display system that may be used in the provision of a head-up display system of comparatively simpler form.

SUMMARY OF THE INVENTION

According to the present invention there is provided a display system wherein two color-filters are positioned one in front of the other in the path of light to a display area, each filter bears symbol-marking and presents to the light, except at its symbol-marking, a light-band transmission characteristic individual to that filter, the arrangement being such that images of the symbols represented by the markings on the two filters appear in the display area, and means is provided for effecting movement of at least one of the filters relative to the other for the purpose of modifying the relationship of the symbol-images to one another in the display area.

More than just two filters may be used, and may be provided as color-film transparencies.

BRIEF DESCRIPTION OF THE DRAWINGS

A display system in accordance with the present invention will now be described, by way of example, with reference to the accompanying drawings, in which.

DESCRIPTION OF THE PREFERRED EMBODIMENTS

Figure 1:
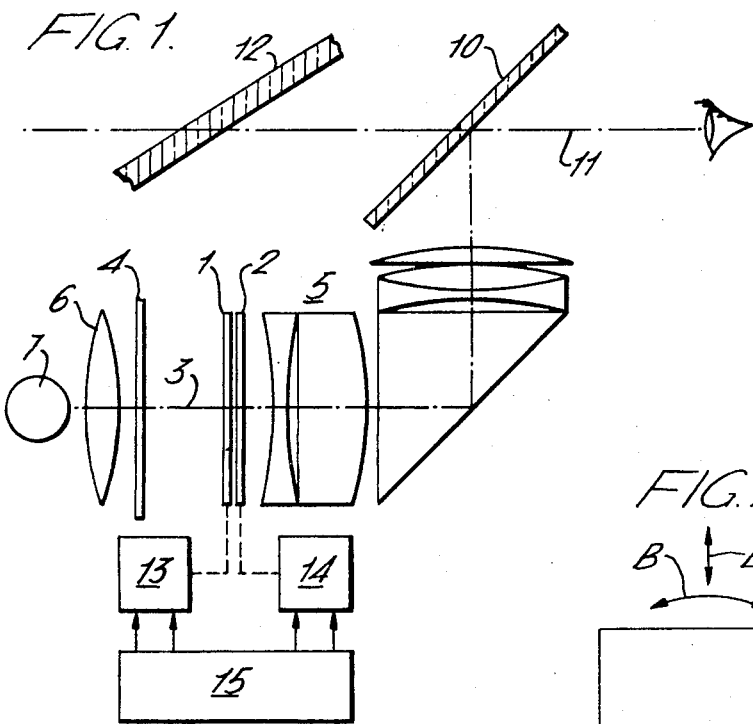
FIG. 1 is a schematic representation of the display system.

The display system shown in FIG. 1 is a head-up display system for use in an aircraft, and is shown as mounted on the windscreen-coaming of the aircraft, in front of the pilot.

Referring to FIG. 1, two complementary color-filters 1 and 2 are positioned, with the filter 2 behind the filter 1, normal to the light-path along an axis 3 from a light-diffusing plate 4 to a collimating lens system 5. The light-diffusing plate 4 is illuminated via a condenser lens 6 from an electric lamp 7 that emits white light having frequency-components that lie respectively within the two mutually-exclusive light-transmission bands of the filters 1 and 2.

Figure 2:
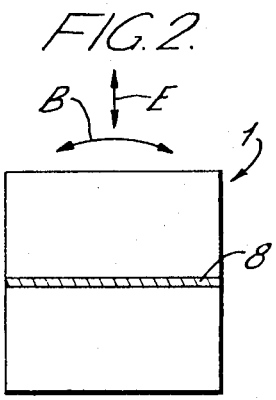
FIGS. 2 and 3 show separately two filters that form part of the display system of FIG. 1.
Figure 3:
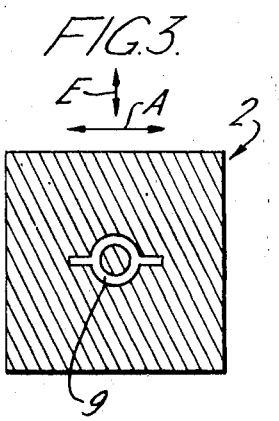

The filters 1 and 2, as shown in FIGS. 2 and 3, are provided as square color-film transparencies of blue-green and orange respectively, and bear individual symbol-markings in these two colors. The blue-green filter 1 bears an horizon symbol 8 in the form of a full-line of orange, whereas the orange filter 2 bears a flight-vector symbol 9 in the form of a circle with short laterally-extending arms, all in blue-green. Since the blue-green and orange transmission bands of the two filters 1 and 2 are mutually exclusive, light from the plate 4 passes to the lens system 5 only where the orange horizon symbol 8 lies in front of the orange field of the filter 2, and where the blue-green flight-vector symbol 9 lies behind the blue-green field of the filter 1.

Referring again to FIG. 1, the two filters 1 and 2 lie very close to one another and both substantially in the focal plane of the collimating lens system 5, so that the lens system 5 projects virtual images of the orange and blue-green symbols 8 and 9 on to a partially-transparent reflector 10 that is positioned in he pilot's line-of-sight 11 through the aircraft-windscreen the The horizon and flight-vector symbols 8 and 9 are accordingly seen by the pilot as though at infinity, against the background of the scene viewed through the windscreen 12.

Movements of the horizon and flight-vector symbols 8 and 9 in the display-area at the reflector 10 are effected simply by means of electromechanical devices 13 and 14 that are coupled respectively to the filters 1 and 2. The devices 13 and 14 move the filters 1 and 2 independently of one another under control of an electrical unit 15 and in accordance with movements of the aircraft in azimuth, bank and elevation, electric signals dependent upon these latter movements being supplied to the control unit 15 from appropriate sensors and navigation-aids in the aircraft. More specifically, the filter 1 bearing the horizon symbol 8, is moved up-and-down transversely of the axis 3 and symbol 8, as indicated by the double-headed arrow E in FIG. 2, in accordance with movement of the aircraft in elevation. The filter 1 in addition is rotated about the axis 3 as indicated by the double-headed arrow B in FIG. 2, in accordance with movement of the aircraft in bank, so that with both movements the image of the horizon symbol 8 is stabilized to give the appropriate simulation of the true horizon in the display area. The filter 2, on the other hand, is moved up-and-down and laterally of the axis 3, as indicated by the double-headed arrows E and A in FIG. 2, in accordance respectively with movements of the aircraft flight-path in elevation and azimuth, so that the flight-vector symbol 9 gives an appropriate simulation in the display area of the actual direction of flight of the aircraft.

With the above-described arrangement, incomplete images of the symbols 8 and 9 appear in the display area whenever the filters 1 and 2 are positioned with the symbols 8 and 9 overlapping one another, since in these circumstances the area of overlap will appear dark. Any disadvantage of this can normally be overcome by providing the symbol in one or other (or possibly both) of the filters 1 and 2 as a clear marking rather than colored, so that light of either orange or blue-green color passed by the other filter, is then transmitted freely throughout the whole of that symbol. For example, the horizon symbol 8 can be formed as a clear, fully-transparent marking on the blue-green filter 1, and then the blue-green flight-vector symbol 9 always appears as an unbroken image whether or not the filters 1 and 2 are positioned with the symbols 8 and 9 overlapping one another. Clearly the question of which image is always to remain unbroken in this way, like that of which particular colors are to be used for the individual symbols, is a matter of choice appropriate to the particular operational circumstances under consideration.

Figure 4:
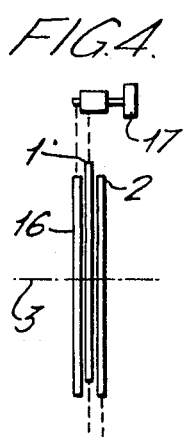
FIGS. 4 and 5 illustrate a modification of the arrangement of FIG. 1 by which a third filter is added to the two shown in FIGS. 2 and 3, FIG. 5 showing the visual effect of superimposition of the three filters upon one another.
Figure 5:
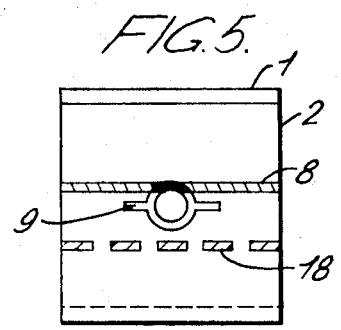

The system may provide a display involving more than just two symbols, either by adding appropriate markings to one or both of the filters 1 and 2, or by adding to the number of filters used. When, for example, it is desired to add a runway-marker or glide-slope symbol extending as a broken-line parallel to, but beneath, the horizon symbol 8, this may be effected simply by adding an appropriate orange marking to the filter 1. If, however, it is desired to provide for ready adjustment of the spacing of the added symbol beneath the horizon symbol 8, then the symbol-marking may be provided as illustrated in FIGS. 4 and 5 on a separate (for example, red) filter. The colors-film filter 16 in the arrangement of FIGS, 4 and 5 is mounted to be carried with the filter 1, but such as to allow simple manual adjustment by a control 17 of their relative positions and, thereby, of the added, broken-line symbol 18 with respect to the horizon symbol 8. Where, as in the arrangement shown in FIGS. 4 and 5, a third filter is added, it may of course be necessary to modify the light-band transmission characteristics of the other two.

The filters 1, 2 and 16 are described above as color-film transparencies, but may alternatively be gelatine color-filters or interference-filters.

Although the present invention has been described above more particularly in relation to the provision of a head-up display, the invention is not limited to this specific application. Clearly the display could be provided directly from the filters without projection, and in this respect the display area involved may simply be a directly-viewed screen positioned behind the filters.

We claim:

1. A display system comprising means defining a display area, means directing light along a path to said display area, two color filters positioned one in front of the other in said light-path, a first of the color filters having a first color-band light-transmission characteristic and bearing a first symbol-marking that has a second color-band light-transmission characteristic, said first and second color-band light-transmission characteristics occupying different and mutually exclusive parts of the spectrum of said light, the second color filter having said second color-band light-transmission characteristic and bearing a second symbol-marking that has said first color-band light-transmission characteristic, whereby images of said first and second symbol-markings appear in different colors to one another in said display area, and means for effecting movement of at least one of said color filters relative to the other color filter to modify the relationship of the symbol-images to one another in said display area.

2. A display system comprising means defining a display area, means directing light along a path to said display area, two color-filters positioned one in front of the other in said light-path, each filter bearing symbol-marking and presenting to the light, except at its symbol-marking, a color-band light-transmission characteristic which characteristic is different from that of the other said filter, the symbol-marking of one of the filters having the same color-band light-transmission characteristic as the other of the two filters and the symbol-marking of each of the two filters having a light-transmission characteristic that includes the color-band of the other filter whereby images of the symbols represented by the markings on the two filters appear in the display area, and means for effecting movement of at least one of the filters relative to the other to modify thereby the relationship of the symbol-images to one another in the display area.

3. A display system according to claim 2 including a partially-transparent reflector and optical means for projecting the images of the symbols onto the reflector.

4. A display system according to claim 2 including a filter bearing a symbol-marking fully transparent to said light.

5. A display system according to claim 2 wherein the filters are color-film transparencies.

6. A display system according to claim 2 including electromechanical devices for moving the filters relative to one another.

7. A display system according to claim 2 including two filters carried one with the other, and wherein the said movement-effecting means includes a manually-adjustable device for adjusting the positions of these two filters relative to one another.

8. A display system according to claim 2 for use in an aircraft, including means for responding to movements of the aircraft to effect relative movements of the filters.

9. A display system according to claim 8 wherein one of the filters bears a symbol-marking in the form of an horizon line, and said means for responding to movements of the aircraft includes means to move this filter in accordance with aircraft-movements in elevation and bank so that the image of said horizon line appearing in the display area provides appropriate simulation of the true horizon.

10. A display system according to claim 8 wherein one of the filters bears a symbol-marking indicative of the flight-direction of the aircraft, and said means for responding to movements of the aircraft includes means to move this filter in accordance with aircraft-movements in elevation and azimuth so that the image of the flight-direction symbol appearing in the display area provides appropriate simulation of the direction of flight of the aircraft.

* * * * *